(12) United States Patent
Poornachandran et al.

(10) Patent No.: US 11,870,669 B2
(45) Date of Patent: Jan. 9, 2024

(54) AT-SCALE TELEMETRY USING INTERACTIVE MATRIX FOR DETERMINISTIC MICROSERVICES PERFORMANCE

(71) Applicant: Intel Corporation, Santa Clara, CA (US)

(72) Inventors: Rajesh Poornachandran, Portland, OR (US); Vincent Zimmer, Issaquah, WA (US); Subrata Banik, Bangalore (IN); Marcos Carranza, Portland, OR (US); Kshitij Arun Doshi, Tempe, AZ (US); Francesc Guim Bernat, Barcelona (ES); Karthik Kumar, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 58 days.

(21) Appl. No.: 17/556,051

(22) Filed: Dec. 20, 2021

(65) Prior Publication Data
US 2023/0198875 A1    Jun. 22, 2023

(51) Int. Cl.
*H04L 43/0817* (2022.01)
*H04L 43/0894* (2022.01)
*G06N 20/00* (2019.01)
*H04L 41/5009* (2022.01)
*H04L 43/0864* (2022.01)

(52) U.S. Cl.
CPC ......... *H04L 43/0817* (2013.01); *G06N 20/00* (2019.01); *H04L 41/5009* (2013.01); *H04L 43/0864* (2013.01); *H04L 43/0894* (2013.01)

(58) Field of Classification Search
CPC ............. H04L 43/0817; H04L 41/5009; H04L 43/0864; H04L 43/0894; G06N 20/00
See application file for complete search history.

(56) References Cited

U.S. PATENT DOCUMENTS

| | | | | |
|---|---|---|---|---|
| 10,827,020 B1* | 11/2020 | Cao | .................. | H04L 67/561 |
| 11,223,522 B1* | 1/2022 | Sethi | .................. | H04L 41/5054 |
| 11,531,575 B1* | 12/2022 | Vummiti | .................. | G06F 16/284 |
| 11,601,393 B1* | 3/2023 | Szigeti | .................. | H04L 61/4511 |
| 2019/0325353 A1* | 10/2019 | Aftab | .................. | G06N 5/02 |
| 2020/0195528 A1* | 6/2020 | Barton | .................. | H04L 41/0894 |

(Continued)

*Primary Examiner* — Javier O Guzman
(74) *Attorney, Agent, or Firm* — JAFFERY WATSON MENDONSA & HAMILTON LLP

(57) ABSTRACT

An apparatus to facilitate at-scale telemetry using interactive matrix for deterministic microservices performance is disclosed. The apparatus includes one or more processors to: receive user input comprising an objective or task corresponding to scheduling a microservice for a service, wherein the objective or task may include QoS, SLO, ML feedback; identify interaction matrix components in an interaction matrix that match the objective or tasks for the microservice; identify knowledgebase components in knowledgebase that match the objective or tasks for the microservice; and determine a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

20 Claims, 7 Drawing Sheets

(56) References Cited

U.S. PATENT DOCUMENTS

| | | | |
|---|---|---|---|
| 2020/0366758 A1* | 11/2020 | Chauhan | H04L 67/1097 |
| 2021/0075700 A1* | 3/2021 | Palladino | H04L 43/062 |
| 2021/0152659 A1* | 5/2021 | Cai | G06F 9/5044 |
| 2021/0303577 A1* | 9/2021 | Liu | G06F 16/24549 |
| 2021/0328933 A1* | 10/2021 | Thyagaturu | H04L 47/24 |
| 2022/0103437 A1* | 3/2022 | Palladino | H04L 67/56 |
| 2022/0129367 A1* | 4/2022 | Sharma | G06F 11/3696 |

* cited by examiner

500

Discover telemetry data for deployed service, the telemetry data comprising available hardware devices, hardware device shared services, hardware device interoperability, and a data flow sequence between the hardware devices
510

↓

Generate, using the telemetry data for the deployed service, an interaction matrix representing an interdependency flow graph
520

↓

Receive one or more contexts for the deployed service, the contexts corresponding to the service and including applications, middleware, microservices, microservice requestors microservice responders, and runtime telemetry data gathered for the service
530

↓

Update a knowledgebase for the service with the received one or more contexts, where a timestamp is associated with the one or more contexts in the knowledgebase
540

↓

Update the interaction matrix and the knowledgebase based on the new incoming telemetry data for the deployed service
550

```
Receive user input comprising an objective or task corresponding to
scheduling a microservice for a service
                                                                    565
```

↓

```
Identify interaction matrix components in an interaction matrix that match the
objective or tasks for the microservice
                                                                    570
```

↓

```
Identify knowledgebase components in knowledgebase that match the
objective or tasks for the microservice
                                                                    575
```

↓

```
Determine a scheduling operation for the microservice, the scheduling
operation to deploy the microservice in a configuration that is in accordance
with the objective or task, wherein the configuration comprises a set of
hardware devices and microservice interaction points determined based on
the interaction matrix components and the knowledgebase components
                                                                    580
```

↓

```
Schedule the microservice using the schedule operation
                                                                    585
```

*FIG. 5B*

AT-SCALE TELEMETRY USING INTERACTIVE MATRIX FOR DETERMINISTIC MICROSERVICES PERFORMANCE

FIELD

Embodiments relate generally to data processing and more particularly to at-scale telemetry using interactive matrix for deterministic microservices performance.

BACKGROUND OF THE DESCRIPTION

Datacenters often leverage a microservice architecture to provide for network infrastructure services. A microservice architecture can arrange an application as a collection of loosely-coupled microservices. Microservices can refer to processes that communicate over a network to fulfill a goal using technology-agnostic protocols. In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization. The microservices deployment model provided by the service mesh is becoming increasingly elastic, providing flexibility to scale up and scale down microservices.

In a service mesh environment, a typical worker node in a compute cluster can handle hundreds of container workloads at the same time. These worker nodes may also have statically-attached specialized hardware accelerators optimized for compute intensive tasks. For instance, a class of hardware accelerators can be optimized to efficiently run cryptography and compression algorithms, or to run machine-learning acceleration algorithms. Such hardware accelerators may be provided as a form of disaggregated computing, where the workloads are distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

The microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices. As such, it can become difficult to provide any sort of guarantees for service level agreements (SLAs) in terms of latency, queue residency, remote procedure call (RPC) overhead, and so on.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers are used throughout the drawing(s) and accompanying written description to refer to the same or like parts.

FIG. 5A is a flow diagram illustrating an embodiment of a method for an at-scale telemetry using interactive matrix for deterministic microservices performance for microservices architectures.

FIG. 5B is a flow diagram illustrating an embodiment of a method for generating an interaction matrix and knowledgebase for use in at-scale telemetry for deterministic microservices performance for microservices architectures.

DETAILED DESCRIPTION

Figure 1:
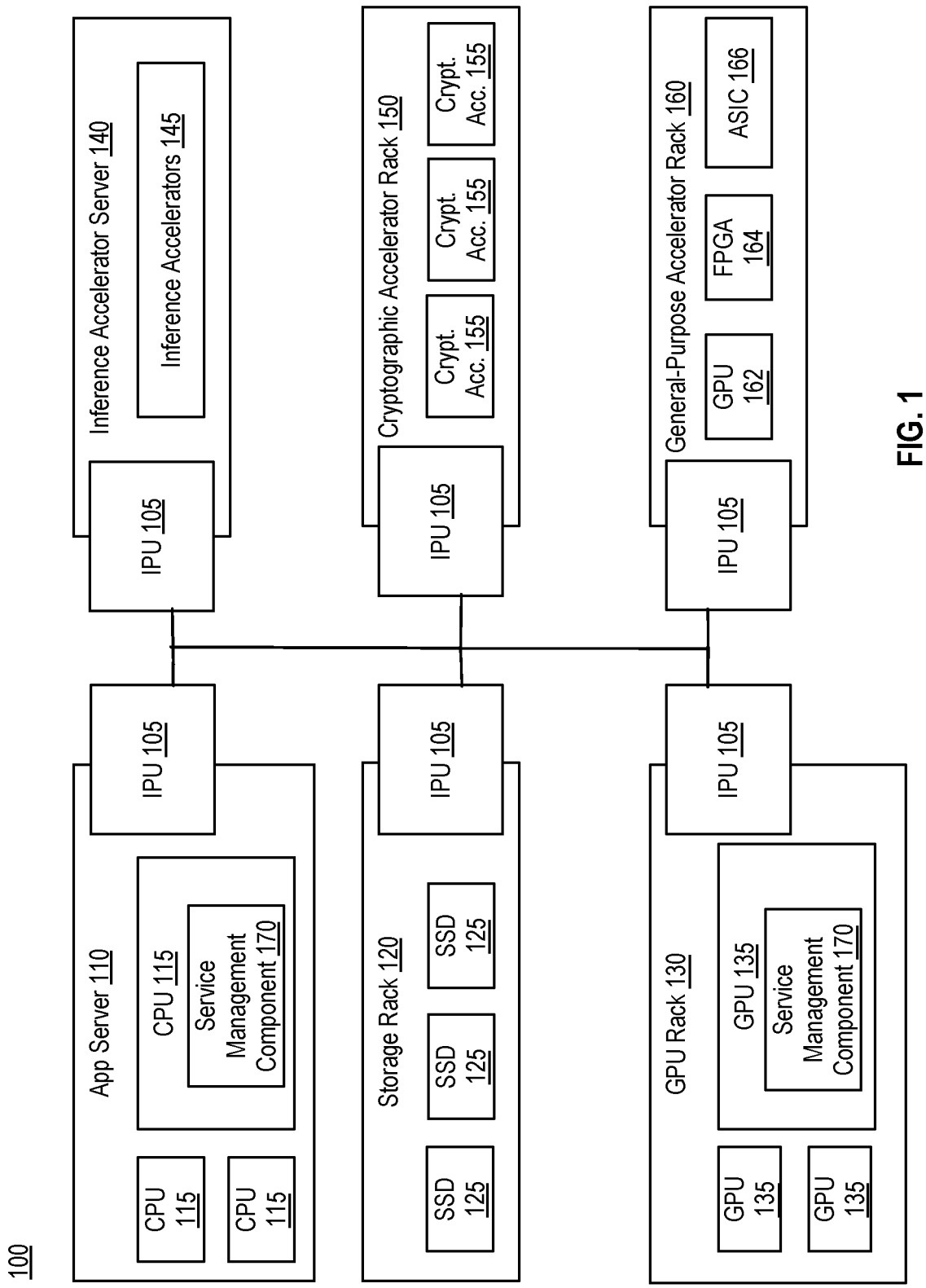
FIG. 1 illustrates a datacenter system that provides for at-scale telemetry using interactive matrix for deterministic microservices performance, in accordance with implementations herein.

Implementations of the disclosure describe at-scale telemetry using interactive matrix for deterministic microservices performance.

Cloud service providers (CSPs) are deploying solutions in datacenters where processing of a workload is distributed on various compute resources, such as central processing units (CPUs), graphics processing units (GPUs), and/or hardware accelerators (including, but not limited to, GPUs, field programmable gate arrays (FPGAs), application-specific integrated circuits (ASICs), cryptographic accelerators, compression accelerators, and so on). Traditionally, these compute resources were running on the same platform and connected via physical communication links, such as peripheral component interconnect express (PCIe).

However, disaggregated computing is on the rise in data centers. With disaggregated computing, CSPs are deploying solutions where processing of a workload is distributed on disaggregated compute resources, such as CPUs, GPUs, and hardware accelerators (including FPGAs, ASICs, etc.), that are connected via a network instead of being on the same platform and connected via physical links such as PCIe. Disaggregated computing enables improved resource utilization and lowers ownership costs by enabling more efficient use of available resources. Disaggregated computing also enables pooling a large number of hardware accelerators for large computation making the computation more efficient and better performing.

Hardware accelerators (also referred to herein as a hardware accelerator resources, hardware accelerator devices, accelerator resource, accelerator device, and/or extended resource) as discussed herein may refer to any of special-purpose central processing units (CPUs), graphics processing units (GPUs), general purpose GPUs (GPGPUs), field programmable gate arrays (FPGAs), application-specific integrated circuits (ASICs), inference accelerators, cryptographic accelerators, compression accelerators, other special-purpose hardware accelerators, and so on.

Moreover, the datacenters used by CSPs to deploy a service mesh often leverage a microservice architecture to provide for network infrastructure services of the service mesh. A microservice architecture can arrange an application as a collection of loosely-coupled microservices. The microservices may be the processes that communicate over a network to fulfill a goal using technology-agnostic protocols. In some cases, the microservices can be deployed using a container orchestration platform providing containerized workloads and/or services. In some examples, the service may be a large service comprising hundreds of microservices working in conjunction with each other or may be a modest individual service. A workload may refer to a resource running on the cloud consuming resources, such as computing power. In some embodiments, an application, service, or microservice may be referred to as a workload, which denotes the workload can be moved around between different cloud platforms or from on-premises to the cloud or vice-versa without any dependencies or hassle.

The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

As previously noted, the microservices deployment model provided by the service mesh is becoming increasingly elastic, providing flexibility to scale up and scale down microservices. As the elasticity of deployment of microservices increases and as microservices architecture transitions to utilizing disaggregated computing resources, there can be microservices deployed for a service across many heterogeneous hardware devices (e.g., IPs, XPUs). As such, it can become difficult to provide any sort of guarantees for service level agreements (SLAs) in terms of latency, queue residency, remote procedure call (RPC) overhead, and so on.

This especially apparent on conventional systems that lack a capability to leverage at-scale telemetry across a variety of XPUs, and the associated software stack, based on the dynamic interaction between the deployed microservices. These conventional system do not provide a clear or precise mapping of interaction among the microservices (also referred to as service "ingredient components") and how these microservices impact the overall determinism in the quality of service (QoS) expectation of the applications (e.g., services). Some conventional systems utilize raw "ingredient-level" (e.g., microservice-level and the underlying components of the microservice) telemetry data. However, such raw ingredient-level telemetry data does not provide much usefulness for elastic microservices with deterministic performance requirements.

Implementations of the disclosure address the above-noted technical drawbacks by providing for at-scale telemetry using interactive matrix for deterministic microservices performance. In implementations herein, techniques are provided for generating dynamic telemetry data based on a flow graph of services involving the interdependency of hardware devices (e.g., IP blocks) and software services to generate a virtual interaction matrix that can provide for guaranteed deterministic performance/latency (would involve discovery, negotiation and telemetry at run-time) across heterogenous IPs/XPUs. Implementations herein provide for the fine-granular breakdown of compute-communications-storage latency (including RPC overhead, Queue residency, etc.).

The interaction matrix of implementations herein may provide for forecasting of next actions for speeding up even more some future requests. Implementations further provide a knowledgebase through which applications, orchestrators, and/or SLA middleware can register contexts that arise for services, requestors of services, infrastructure and runtime events, etc. The end-to-end handling of these contexts in the knowledgebase, along with timestamps corresponding to the services, is beneficial and can be utilized to understand the interaction subgraphs that are to be discerned from raw interaction metrics.

Implementations of the discosure provide technical advantages over the conventional approaches discussed above. One technical advantage is that implementations provide for improved deterministic behavior, while maintaining flexibility of services/microservices deployment and meeting SLA (e.g., Latency, Queue Residency, RPC Overhead, etc.) with Microservices deployment across heterogenous IPs/XPUs. Implementations herein also provide the technical of advantage of providing the capability to leverage the at-scale telemetry across a variety of heterogeneous XPUs, and their associated software stack, based on the dynamic interaction between the microservices.

FIG. 1 illustrates a datacenter system 100 that provides for at-scale telemetry using interactive matrix for deterministic microservices performance, in accordance with implementations herein. Datacenter system 100 illustrates an example data center (for example, hosted by a cloud service provider (CSP)) providing a variety of XPUs (heterogeneous processing units) for processing tasks at the datacenter, where an XPU can include one or more of: a central processing unit (CPU) 115, a graphics processing unit (GPU) 135 (including a general purpose GPU (GPGPU), ASICs, or other processing units (e.g., accelerators 145, 155, 166, inference accelerators 145, cryptographic accelerators 155, programmable or fixed function FPGAs 164, application-specific integrated circuit (ASICs) 166, compression accelerators, and so on). The datacenter may also provide storage units for data storage tasks, as well. The storage units may include solid state drive (SSD) 125, for example. The XPUs and/or storage units may be hosted with similar-type units (e.g., CPUS 115 hosted on an application server (app server) 110, SSDs 125 hosted on a storage rack 120, GPUs 135 hosted on a GPU rack 130, inference accelerators 145 hosted on an inference accelerator server 140, cryptographic accelerators 155 hosted on a cryptographic accelerator rack 150, and general-purpose accelerators 162, 164, 166 hosted on accelerator rack 160.

The datacenter of system 100 provides its hosted processing components 115, 125, 135, 145, 155, 162, 164, 166 with a variety of offloads using, for example, IPUs 105 that are directly attached to the respective host processing component. Although IPUs 105 are discussed for example purposes, other programmable network devices, such as DPUs or SmartNICs, may be used interchangeable for IPUs 105 herein. The offloads provided may be networking, storage, security, etc. This allows the processing components 115, 125, 135, 145, 155, 162, 164, 166 to run without a hypervisor, and provides CSPs the capability of renting out the entire host in a datacenter to their security-minded customers, or avoid cross-talk and other problems associated with multi-tenant hosts.

An IPU 105 can provide a role in data centers by providing the datacenter operator, such as a Cloud Service Provider (CSP), a control point for security, acceleration, telemetry and service orchestration. IPU 105 architecture may build upon existing Smart Network Interface Card (SmartNIC) features and is a part of controlling security and data acceleration within and across distributed platforms. It is a secure domain controlled by CSPs for managing a platform, providing services to tenants, and securing access into the data center network. The IPU 105 increases the performance and predictability for distributed runtimes and enables scaling to multi-terabit throughputs by offloading host services, reliable transport, and optimizing data copies.

IPUs 105 have grown in complexity over the years, starting with foundational NICs, whose sole purpose was to get packets into the host and out of it. With the addition of networking software offload, the NICs evolved to become SmartNICs, that are capable of offloading functions, such as VSwitch, VIRTIO-Net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for at-scale telemetry using interactive matrix for deterministic microservices performance. In one implementation, datacenter system 100 includes one or more resources that can implement service management component 170 to provide the at-scale telemetry using interactive matrix for deterministic microservices performance. For illustrative example purposes, service management component 170 is shown in the CPU 115 and GPU 135, respectively, of datacenter system 100. However, service management component 170 may operate in one or more of the various other disaggregated resources of datacenter system 100 in accordance with implementations herein. As such, the resources of datacenter system 100 may be in different platforms connected via a network (not shown) in the datacenter system 100. In some implementations, software and/or middleware can cause the resources of datacenter system 100 to logically appear to be in the same platform. Furthermore, transport protocols implemented in software and/or hardware (e.g., network interface cards (NICs)) can make the remote resources logically appear as if they are local resources as well.

Further details of the service management component 170 implementing the at-scale telemetry using interactive matrix for deterministic microservices performance is described below with respect to FIGS. 2-6.

Figure 2:
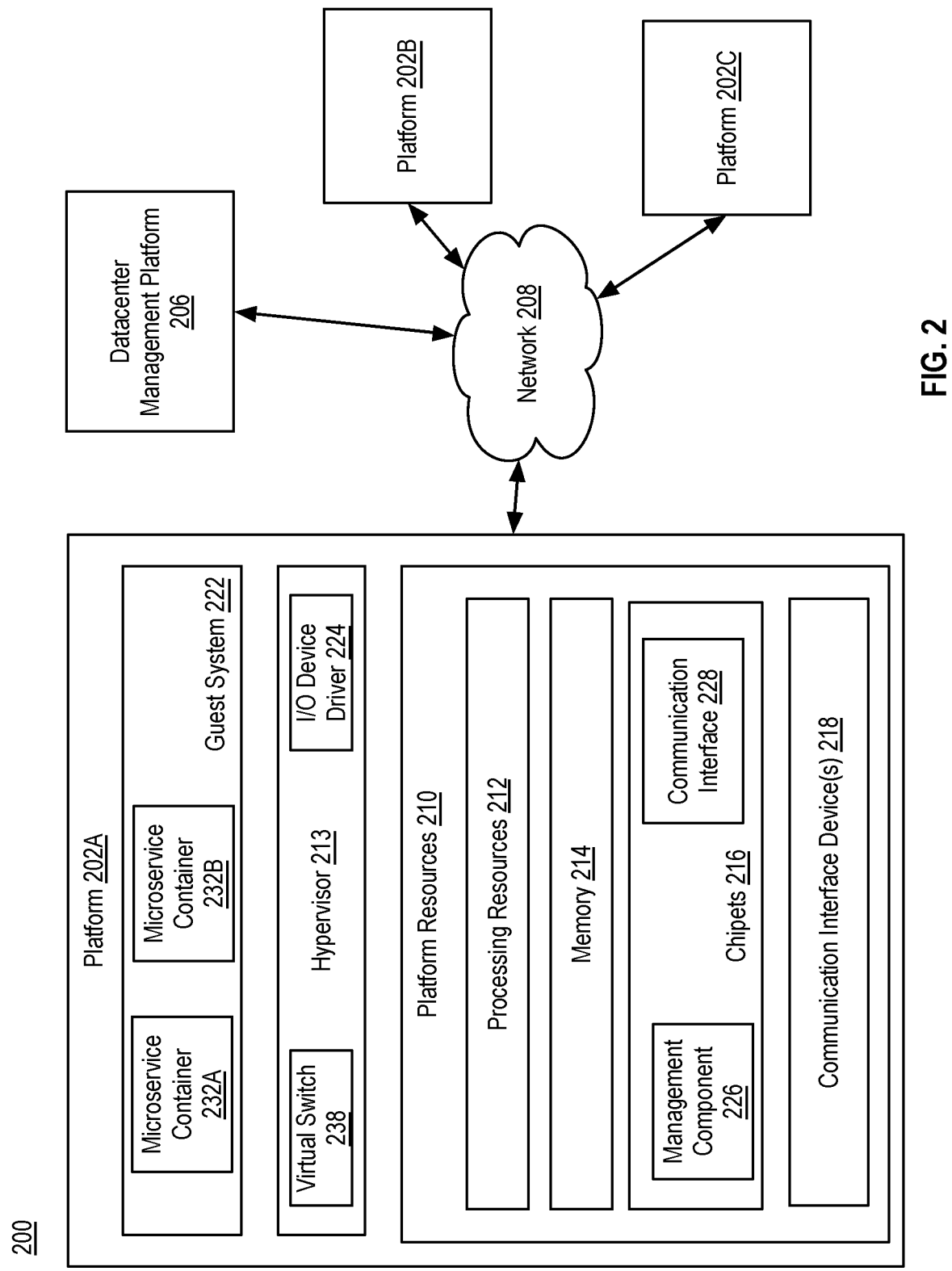
FIG. 2 illustrates a block diagram of components of a computing platform in a datacenter system, according to implementations herein.

FIG. 2 illustrates a block diagram of components of a computing platform 202A in a datacenter system 200, according to implementations herein. In the embodiment depicted, platforms 202A, 202B, and 202C (collectively referred to herein as platforms 202), along with a data center management platform 206 are interconnected via network 208. In other embodiments, a computer system may include any suitable number of (i.e., one or more) platforms. In some embodiments (e.g., when a computer system includes a single platform), all or a portion of the datacenter management platform 206 may be included on a platform 202.

A platform 202 may include platform resources 210 with one or more processing resources 212 (e.g., XPUs including CPUs, GPUs, FPGAs, ASICs, other hardware accelerators), memories 214 (which may include any number of different modules), chipsets 216, communication interface device(s) 218, and any other suitable hardware and/or software to execute a hypervisor 213 or other operating system capable of executing workloads associated with applications running on platform 202.

In some embodiments, a platform 202 may function as a host platform for one or more guest systems 222 that invoke these applications. Platform 202A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof.

Each platform 202 may include platform resources 210. Platform resources 210 can include, among other logic enabling the functionality of platform 202, one or more processing resources 212 (such as CPUs, GPUs, FPGAs, other hardware accelerators, etc.), memory 214, one or more chipsets 216, and communication interface devices 228. Although three platforms are illustrated, computer platform 202A may be interconnected with any suitable number of platforms. In various embodiments, a platform 202 may reside on a circuit board that is installed in a chassis, rack, or other suitable structure that comprises multiple platforms coupled together through network 208 (which may comprise, e.g., a rack or backplane switch).

In the case of processing resources 212 comprising CPUs, the CPUs may each comprise any suitable number of processor cores and supporting logic (e.g., uncores). The cores may be coupled to each other, to memory 214, to at least one chipset 216, and/or to a communication interface device 218, through one or more controllers residing on the processing resource 212 (e.g., CPU) and/or chipset 216. In some embodiments, a processing resource 212 is embodied within a socket that is permanently or removably coupled to platform 202A. A platform 202 may include any suitable number of processing resources 212.

Memory 214 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 214 may be used for short, medium, and/or long term storage by platform 202A. Memory 214 may store any suitable data or information utilized by platform resources 210, including software embedded in a computer readable medium, and/or encoded logic incorporated in hardware or otherwise stored (e.g., firmware). Memory 214 may store data that is used by cores of processing resources 212. In some embodiments, memory 214 may also comprise storage for instructions that may be executed by the processing resources 212 (e.g., cores of CPUs) or other processing elements (e.g., logic resident on chipsets 216) to provide functionality associated with the management component 226 or other components of platform resources 210.

A platform 202 may also include one or more chipsets 216 comprising any suitable logic to support the operation of the processing resources 212. In various embodiments, chipset 216 may reside on the same die or package as a processing resource 212 or on one or more different dies or packages. Each chipset may support any suitable number of processing resources 212. A chipset 216 may also include one or more controllers to couple other components of platform resources 210 (e.g., communication interface device 228 or memory 214) to one or more processing resources 212.

In the embodiment depicted, each chipset 216 also includes a management component 226. Management component 226 may include any suitable logic to support the operation of chipset 216. In a particular embodiment, a management component 226 can collect real-time telemetry data from the chipset 216, the processing resources 212, and/or memory 214 managed by the chipset 216, other components of platform resources 210, and/or various connections between components of platform resources 210.

Chipsets 216 also each include a communication interface device 228. Communication interface device 228 may be used for the communication of signaling and/or data between chipset 216 and one or more I/O devices, one or more networks 208, and/or one or more devices coupled to network 208 (e.g., system management platform 206). For example, communication interface device 228 may be used to send and receive network traffic such as data packets. In a particular embodiment, a communication interface device 228 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), FibreChannel, InfiniBand, Wi-Fi, or other suitable standard. A NIC may include one or more physical ports that may couple to a cable (e.g., an Ethernet cable). A NIC may enable communication between any suitable element of chipset 216 (e.g., management component 226) and another device coupled to network 208. In various embodiments, a NIC may be integrated with the chipset 216 (i.e., may be on the same integrated circuit or circuit board as the rest of the chipset logic) or may be on a different integrated circuit or circuit board that is electromechanically coupled to the chipset.

Platform resources 210 may include an additional communication interface 228. Similar to communication interface devices 218, communication interfaces 228 may be used for the communication of signaling and/or data between platform resources 210 and one or more networks 208 and one or more devices coupled to the network 208. For example, communication interface 228 may be used to send and receive network traffic such as data packets. In a particular embodiment, communication interfaces 228 comprise one or more physical NICs. These NICs may enable communication between any suitable element of platform resources 210 (e.g., processing resources 212 or memory 214) and another device coupled to network 208 (e.g., elements of other platforms or remote computing devices coupled to network 208 through one or more networks).

Platform resources 210 may receive and perform any suitable types of workloads. A workload may include any request to utilize one or more resources of platform resources 210, such as one or more cores or associated logic. For example, a workload may comprise a request to instantiate a software component, such as an I/O device driver 224 or guest system 222; a request to process a network packet received from a microservices container 232A, 232B (collectively referred to herein as microservice containers 232) or device external to platform 202A (such as a network node coupled to network 208); a request to execute a process or thread associated with a guest system 222, an application running on platform 202A, a hypervisor 213 or other operating system running on platform 202A; or other suitable processing request.

A microservice container 232 may emulate a computer system with its own dedicated hardware. A container 232 may refer to a standard unit of software that packages up code and all its dependencies, so the application runs quickly and reliably from one computing environment to another. A container image is a lightweight, standalone, executable package of software that includes components used to run an application: code, runtime, system tools, system libraries and settings. Containers 232 take advantage of a form of operating system (OS) virtualization in which features of the OS are leveraged to both isolate processes and control the amount of CPU, memory, and disk that those processes have access to.

When implementing containers 232, hypervisor 213 may also be referred to as a container runtime. Although implementations herein discuss virtualization of microservice functionality via containers, in some implementations, virtual machines may be hosted by hypervisor 213 and utilized to host microservices and/or other components of a service provided by an application.

A hypervisor 213 (also known as a virtual machine monitor (VMM)) may comprise logic to create and run guest systems 222. The hypervisor 213 may present guest operating systems run by virtual machines with a virtual operating platform (i.e., it appears to the virtual machines that they are running on separate physical nodes when they are actually consolidated onto a single hardware platform) and manage the execution of the guest operating systems by platform resources 210. Services of hypervisor 213 may be provided by virtualizing in software or through hardware-assisted resources that utilize minimal software intervention, or both. Multiple instances of a variety of guest operating systems may be managed by the hypervisor 213. Each platform 202 may have a separate instantiation of a hypervisor 213.

In implementations herein, the hypervisor 213 may also be implemented as a container runtime environment capable of building and containerizing applications.

Hypervisor 213 may be a native or bare—metal hypervisor that runs directly on platform resources 210 to control the platform logic and manage the guest operating systems. Alternatively, hypervisor 213 may be a hosted hypervisor that runs on a host operating system and abstracts the guest operating systems from the host operating system. Hypervisor 213 may include a virtual switch 238 that may provide virtual switching and/or routing functions to virtual machines of guest systems 222.

Virtual switch 238 may comprise a software element that is executed using components of platform resources 210. In various embodiments, hypervisor 213 may be in communication with any suitable entity (e.g., a SDN controller) which may cause hypervisor 213 to reconfigure the parameters of virtual switch 238 in response to changing conditions in platform 202 (e.g., the addition or deletion of microservice containers 232 or identification of optimizations that may be made to enhance performance of the platform).

The elements of platform resources 210 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus, to name a few examples.

Elements of the computer platform 202A may be coupled together in any suitable manner such as through one or more networks 208. A network 208 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

In implementations herein, one or more of processing resources 212 and/or microservice containers 232 may provide a service management component (not shown), such as service management component 170 described with respect to FIG. 1. Further details of how the processing resources 212 and/or microservice containers 232 implement the service management component for providing at-scale telemetry using interactive matrix for deterministic microservices performance are described below with respect to FIGS. 3-6.

Figure 3:
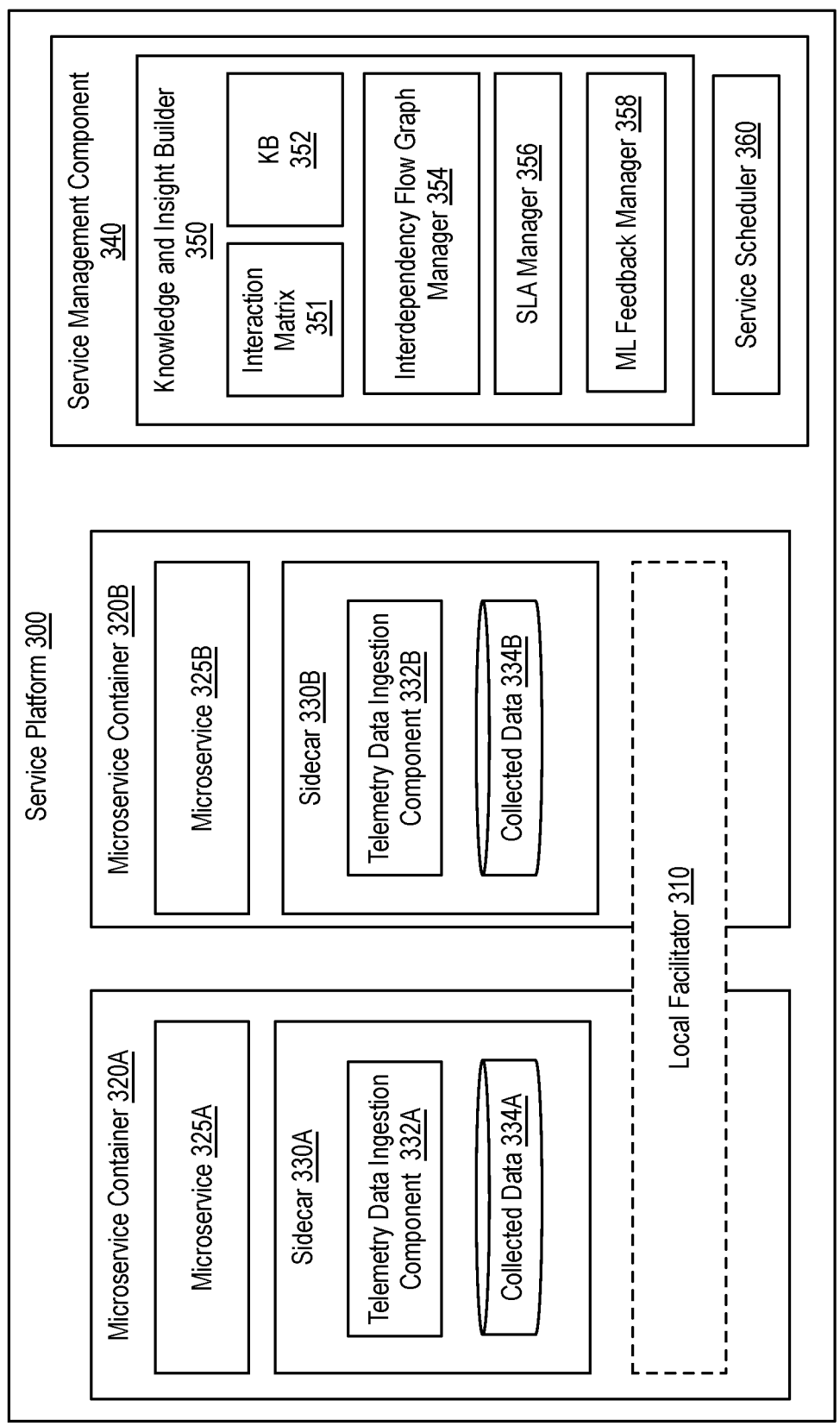
FIG. 3 is a block diagram of a service platform implementing at-scale telemetry using interactive matrix for deterministic microservices performance, in accordance with implementations herein.

FIG. 3 is a block diagram of a service platform 300 implementing at-scale telemetry using interactive matrix for deterministic microservices performance, in accordance with implementations herein. In one implementation, service platform 300 is the same as platform 202 of datacenter system 200 described with respect to FIG. 2. In some implementations, service platform 300 may be hosted in a datacenter that may or may not utilize disaggregated computing. Embodiments herein are not limited to implementation in disaggregated computing environments, and may be deployed across a large spectrum of different datacenter environments. The disaggregated computing datacenter system 200 of FIG. 2 is provided as an example implementation for service platform 300 and is not intended to limit embodiments herein.

In one implementation, service platform 300 may host a service implemented with one or more microservice containers 320A, 320B (collectively referred to herein as microservice container 320). Microservice containers 320 may be the same as microservice containers 232 described with respect to FIG. 2. The service may be orchestrated and manager using service management component 340. Service management component 340 may be implemented by hardware, software, firmware and/or any combination of hardware, software and/or firmware.

Service platform 300 may function as a host platform for a service, implementing deployed microservices of the service as one or more microservice containers 320 that invoke functionalities of the service. Service platform 300 may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things (IoT) environment, an industrial control system, other computing environment, or combination thereof. In implementations herein, containers 320 may be implemented using hardware circuitry, such as one or more of a CPU, a GPU, a hardware accelerator, and so on. In one embodiment, containers 320 may be implemented using platform 202 described with respect to FIG. 2.

Microservices containers 320 may include logic to implement the functionality of the microservice 325A, 325B (collectively referred to herein as microservices 325) and a sidecar 330A, 330B (collectively referred to herein as sidecars 330. A sidecar 330 can be a container that runs on the same pod as the microservice 325. As depicted herein, sidecar 330 is illustrated as part of the microservice container 320, but sidecar 330 may be implemented as a separate container then microservice 325 functionality in some implementations.

In implementations herein, sidecar 330 may include one or more components to support at-scale telemetry using interactive matrix for deterministic microservices performance. These components can include data ingestion 332A, 332B (collectively referred to herein as data ingestion 332) and collected data 334A, 334B (data stores collectively referred to as collected data 334).

A local facilitator 310 is connected to the sidecars 330 and can operate in a privileged space of the microservice containers 320. In one implementation, local facilitator 310 is a privileged daemon with access to low-level information. For example, local facilitator 310 has access to low-level software telemetry and hardware data, such as registries.

Service platform 300 also includes a service management component 340. Service management component 340 and its underlying sub-components (e.g., knowledge and insight builder 350 and/or service scheduler 360) may be implemented using hardware circuitry, such as one or more of a CPU, a GPU, a hardware accelerator, and so on. In one embodiment, service management component 340 may be implemented using platform 202 described with respect to FIG. 2. More generally, the example service management component 340 may be implemented by hardware, software, firmware and/or any combination of hardware, software and/or firmware. Thus, for example, the service management component 340 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In one implementation, service management component 340 operates to control management and/or orchestration of resources, such as microservices, for a service of a service mesh hosted by a datacenter, such as datacenter system 100 of FIG. 1. Service management component 340 may located at the same nodes or on a different node of microservice containers 320 in the service platform 300.

Service management component 340 may include one or more components to support at-scale telemetry using interactive matrix for deterministic microservices performance. These components can include a knowledge and insight builder 350 and a service scheduler 360. The knowledge and insight builder 350 can host an interaction matrix 351, knowledgebase (KB) 352, interdependency flow graph manager 354, service level agreement (SLA) manager 356, and machine learning (ML) feedback manager 358.

In implementations herein, the microservice containers 320 and service management component 340 provide for at-scale telemetry using interactive matrix for deterministic microservices performance. In one implementation, the sidecar 330 for each microservice container 320 includes a telemetry data ingestion component 332 that receives telemetry data of the service platform 300 that is pertinent to the microservice 325. This telemetry data can include lower-level layers in the architecture (e.g., privileged space) and application (microservice 325) telemetry data and logs (e.g., user space). The collected data 334 maintains this microservice-related telemetry data in a data store.

At the service management component 340, the collected telemetry data 334 from microservice containers 320 of service platform 300 is ingested by knowledge and insight builder 350 for use in generating interaction matrix 351 and knowledgebase (KB) 352. In implementations herein, knowledge and insight builder 350 provides for fine-granular telemetry aggregation across heterogenous hardware devices (e.g., IPs, XPUs) that are used to deploy microservices for a service. Obtaining the aggregated telemetry data can include discovery, negotiation, and ingestion of telemetry data generated during run-time of the service. For example, telemetry data can be ingested by telemetry data ingestion component 332 of sidecar 330, stored in collected data 334, and provided to knowledge and insight builder 350.

The knowledge and insight builder 350 combines the aggregated telemetry data with an interdependency flow graph for the service in order to generate a feedback-loop based interaction matrix 351 for the service. In implementations herein, the interaction matrix 351 can be generated by knowledge and insight builder 350 based on the aggregated telemetry data of the service, where such the telemetry data includes available hardware devices, hardware device shared services, hardware device interoperability, a level of software support from components of the service, and a data flow sequence between the hardware devices.

In one implementation, the data flow sequence may be provided by the interdependency flow graph manager 354. The data flow sequence can be based on a roster of microservices deployed for the service, a compute flow sequence of the microservices deployed for the service, a data flow metrics for the microservices deployed for the services, and emulation capabilities and limitations of the service.

The data flow sequence may be a flow graph that is determined based on the list of ingredient microservice components being stitched together. This list of ingredient microservice components can be based on discovered available services, and control and data flow including branch prediction. In one example, the list of ingredient microservice components can include information such as "g" remote procedure call (gRPC) interface attach points between the microservices at a given layer and across layers, the precision of the data (e.g., CGEMM, DGEMM, INT8, etc.) being operated upon, and the native XPU hardware acceleration capabilities for the same.

The knowledge and insight builder 350 also builds and maintains a KB 352 to provide a knowledge store of what has happened in the past for a given set of hardware and microservices of the service. In one implementations, the KB 352 stores complex structured and unstructured information used by a computer system. The KB 352 may provide a library of information about a product, service, department, or topic. KB 352 can include registrations of contexts that arise for services, requestors of services, infrastructure and runtime events associated with the application, service, service orchestrator, and SLA middleware, for example. The context may refer to the properties of both the requestor and the information requested that frame and scope the service interaction requested and/or provided. The end to end handling of these contexts, along with corresponding timestamps, can be maintained in the KB 352 and utilized to understand service interaction subgraphs that are to be discerned from raw interaction metrics.

In one implementation, the interaction matrix 351, along with KB 352, can be used to guarantee microservices SLAs for the service. For example, the interaction matrix 351, along with the KB 352, can be used to guarantee deterministic performance and/or latency of the microservices. This guarantee of microservice SLAs can be used by the service scheduler 360 to determine microservice scheduling decisions, such as microservice deployment, migration, and/or relocation decisions. The service scheduler 360 may be a scheduler component of the service mesh used for scheduling operations.

In implementations herein, the service scheduler can utilize derived telemetry from the interaction matrix 351 and the KB 352 to perform more complex computations that are utilized to identify complex dependencies. For instance, if trying to determine whether connectivity between service A and Service B may suffer a certain overhead or latency, a metric can be computed to determine an average (or 99th latency) across all the different paths (e.g., routes or communication links) between the two points. In one example, the interaction matrix 351 can provide a fine-granular breakdown of compute, communications, and storage latency (e.g., remote procedure call (RPC) overhead, queue residency, etc.).

In some implementations, the interaction matrix 351 may provide for forecasting of next actions for speeding up future requests. In one example, the service scheduler 360 may utilize the interaction matrix 351 to track end-to-end latency or bandwidth for example. This metric could then be partitioned (e.g., via graph partitioning techniques) to view choke-points or bottlenecks, and also used to determine best-fits or "graph cuts" to map onto existing or an expanded set of platform resources.

In implementations herein, the interaction matrix 351 may be accessed to generate interaction matrix telemetry data, such as the telemetry data described above. Such interaction matrix telemetry data may be function of the interaction matrix 351, hardware device QoS metric(s), application (or service) service level objectives (SLOs), and/or machine learning (ML) feedback metric(s).

In one implementation, the SLA manager 356 may provide SLA details including the hardware device QoS metric(s) and/or the application (service) SLOs. The hardware device QoS metric(s) may be based on one or more of a compute metric of hardware devices utilized by the service, a latency metric of hardware devices utilized by the service, or a throughput metric of hardware devices utilized by the service. The application (service) SLOs may be based on one or more of options of hardware devices utilized by the service, latency/jitter QoS requirements of the service, or power/total cost of ownership (TCO) requirements of the service.

In one implementation, the ML feedback manager 358 may provide the ML feedback metric(s). The ML feedback metric(s) may be based on one or more of reinforcement learning applied to the interaction matrix, policy management metrics, and updated weights for a network utilized to perform the ML.

In embodiments herein, the knowledge and insight builder 350 may utilize one or more methods to provide the at-scale telemetry using interactive matrix for deterministic microservices performance, as described above. Examples of such methods may be as follows:

Interaction Matrix Telemetry=FUNC_TELEMETRY (Interaction_Matrix, XPU QoS, App SLO, ML Feedback);
Interaction_Matrix=FUNC (XPU roster, XPU shared services, XPU interop, XPU flow graph);
XPUflow_graph=FUNC (Microservices roster, Microservices Compute flow (e.g., gRPC call sequence), Microservices Data flow (precision, format, etc.), Emulation Capability/limitations);
XPU QoS=FUNC_TELEMETRY (XPU Compute, XPU Latency, XPU Throughput);
APP SLO=FUNC (XPU options, Latency/Jitter QoS Requirement, Power/TCO Requirement);
ML Feedback=FUNC (RL of Interaction_Matrix, Policy Management, Updated Weights);
Knowledgebase_Context_Mapper=FUNC_CONTEXT_REG (Applications, Middleware, uServices, uService Requestor, uService Responder, Runtime Telemetry); (where uServices refers to microservices)
uServices_Scheduler=FUNC (Interaction_Matrix, Knowledgebase_Context_Mapper).

Figure 4:
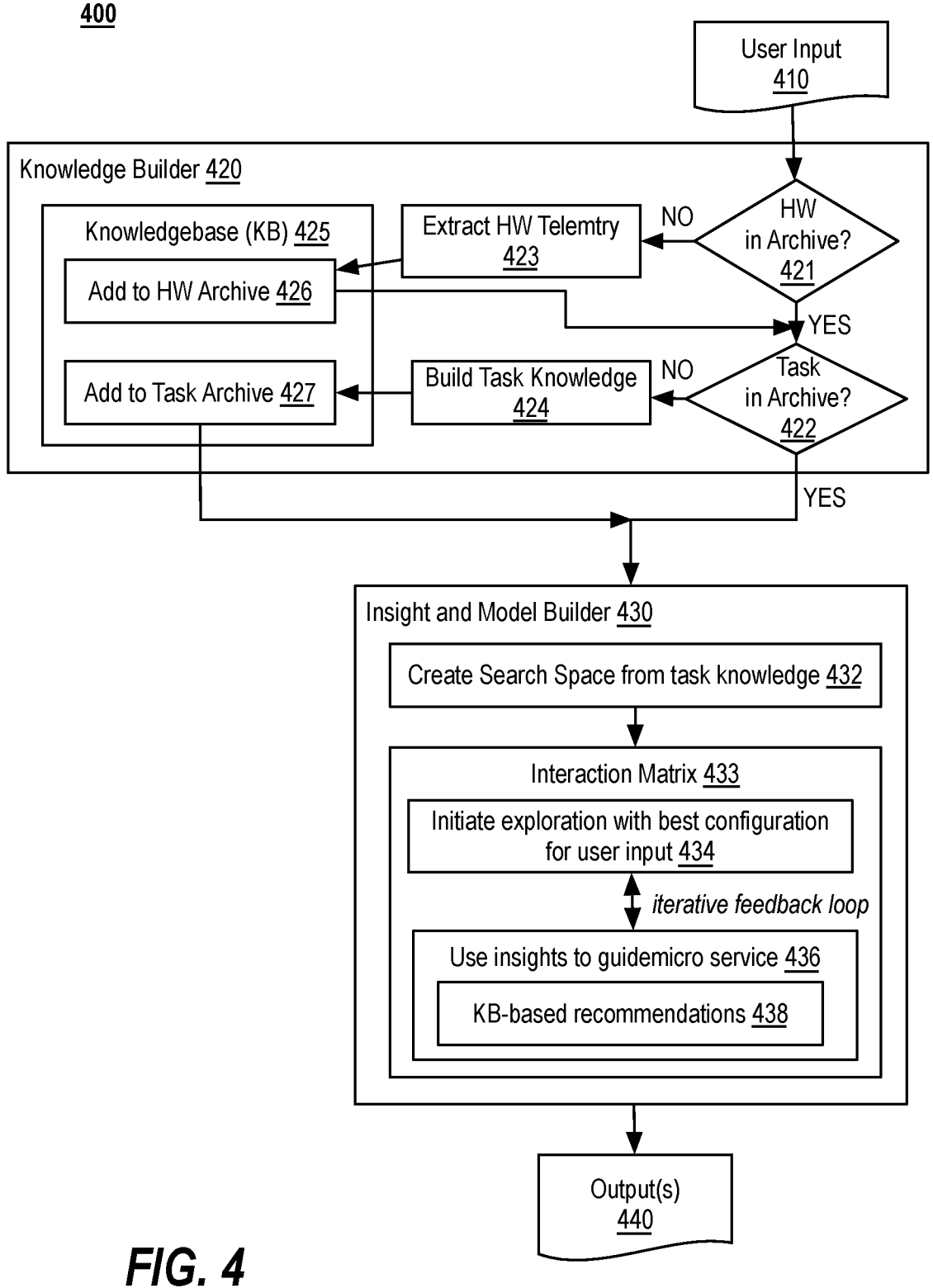
FIG. 4 is a flow diagram illustrating an operational flow for at-scale telemetry using interactive matrix for deterministic microservices performance, in accordance with implementations herein.

FIG. 4 is a flow diagram illustrating an operational flow 400 for at-scale telemetry using interactive matrix for deterministic microservices performance, in accordance with implementations herein. In one implementations, service management component 340 described with respect to FIG. 3 performs operational flow.

Operational flow 400 begins when user input 410 is received at knowledge builder 420. In one implementation, knowledge builder 420 is the same as knowledge and insight builder 350 described with respect to FIG. 3. In one implementation, the user input 410 may include an objective, task, or target hardware associated with scheduling of a microservice of a service managed by a service mesh in a datacenter. The objective, task, or target hardware may correspond to an SLA of the service, such as a QoS metric or an SLO associated with the service. In one implementation, the objective or task may include a hardware device quality of service (QoS) metric corresponding to the microservice, a service level objective (SLO) corresponding to the microservice, or a machine learning (ML) feedback metric corresponding to the microservice.

The knowledge builder 420 may determine 421 whether the user input includes any hardware information that already exists in an archive of the knowledge builder 420. In one implementation, the archive of the knowledge builder 420 may be a knowledgebase (KB) 425 created and maintained by the knowledge builder 420. In one implementation, the KB 425 is the same as KB 352 described with respect to FIG. 3. The KB 425 may have a hardware archive and a task archive. If the hardware associated with the user input does not exist in the hardware archive of KB 425, then hardware telemetry data associated with the hardware is extracted 423 and added 426 to the hardware archive of KB 425 and operational flow continues to block 422.

If the hardware associated with the user input 410 already exists in the hardware archive of KB 425, then operational flow 400 also continues to block 422, where it is determined 422 whether a task associated with the user input 410 already exists in the task archive of the KB 425. If not, then task knowledge associated with the task is built 424 and added 427 to the task archive of KB 425 and operational flow 400 continues to insight and model builder 430. If the task associated with user input 410 already exists in the task archive of KB 425, then operational flow 400 also proceeds to insight and model builder 430.

In one implementation, insight and model builder is the same as insight and knowledge builder 350 described with respect to FIG. 3. Insight and model builder 430 may receive user input 410 subsequent to processing by knowledge builder 420, and create 432 a search space from the task knowledge associated with user input 410. This search space may be provided to interaction matrix 433. In one implementation, interaction matrix 433 is the same as interaction matrix 351 described with respect to FIG. 3. A scheduler, such as service scheduler 360 may initiate 434 exploration with interaction matrix 433 to identify an optimized configuration for the provided user input 410. The optimized configuration may refer to a set of hardware devices and microservice interaction points that provide improved performance of the service, as determined based on the interaction matrix 433 and the knowledgebase 425. The insights identified from exploration 434 of the interaction matrix 433 may be used to guide 436 the microservice scheduling associated with user input 410 and to provide KB-based recommendations 438.

In one implementation, the KB-based recommendations 438 result in an output 440 from operational flow 400. The output 440 may include a recommended scheduling operation for the microservice. In addition, the output 440 may include a generated/updated interdependency flow graph for use to generate/update the interaction matrix 433, as well as updates to the hardware and task archive of the KB 425.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 5A is a flow diagram illustrating an embodiment of a method 500 for an at-scale telemetry using interactive matrix for deterministic microservices performance for microservices architectures. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a sidecar in a microservice container, such as processing device executing a service management component 340 of service platform 300 of FIG. 3, may perform method 500.

The example process of method 500 of FIG. 5 begins at block 510 where a processing device may discover telemetry data for deployed service, the telemetry data comprising available hardware devices, hardware device shared services, hardware device interoperability, a level of software support from components of the service, and a data flow sequence between the hardware devices. At block 520, the processing device may generate, using the telemetry data for the deployed service, an interaction matrix representing an interdependency flow graph.

Then, at block 530, the processing device may receive one or more contexts for the deployed service, the contexts corresponding to the service and including applications, middleware, microservices, microservice requestors microservice responders, and runtime telemetry data gathered for the service. Subsequently, at block 540, the processing device may update a knowledgebase for the service with the received one or more contexts, where a timestamp is associated with the one or more contexts in the knowledgebase. Lastly, at block 550, the processing device may update the interaction matrix and the knowledgebase based on the new incoming telemetry data for the deployed service.

FIG. 5B is a flow diagram illustrating an embodiment of a method 560 for generating an interaction matrix and knowledgebase for use in at-scale telemetry for deterministic microservices performance for microservices architectures. Method 560 may be performed by processing logic that may comprise hardware (e.g., circuitry, dedicated logic, programmable logic, etc.), software (such as instructions run on a processing device), or a combination thereof. More particularly, the method 560 may be implemented in one or more modules as a set of logic instructions stored in a machine- or computer-readable storage medium (also referred to herein as a non-transitory computer-readable storage medium) such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 560 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a datacenter system implementing a sidecar in a microservice container, such as processing device executing a service management component 340 of service platform 300 of FIG. 3, may perform method 560.

The example process of method 560 of FIG. 5 begins at block 565 where the processing device may receive user input comprising an objective or task corresponding to scheduling a microservice for a service, wherein the objective or task may include QoS, SLO, ML feedback. Then, at block 570, the processing device may identify an interaction matrix components in interaction matrix that match the objective or tasks for the microservice. At block 575, the processing device may identify knowledgebase components in knowledgebase that match the objective or tasks for the microservice.

Subsequently, at block 580, the processing device may determine a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components. Lastly, at block 585, the processing device may schedule the microservice using the schedule operation.

Figure 6:
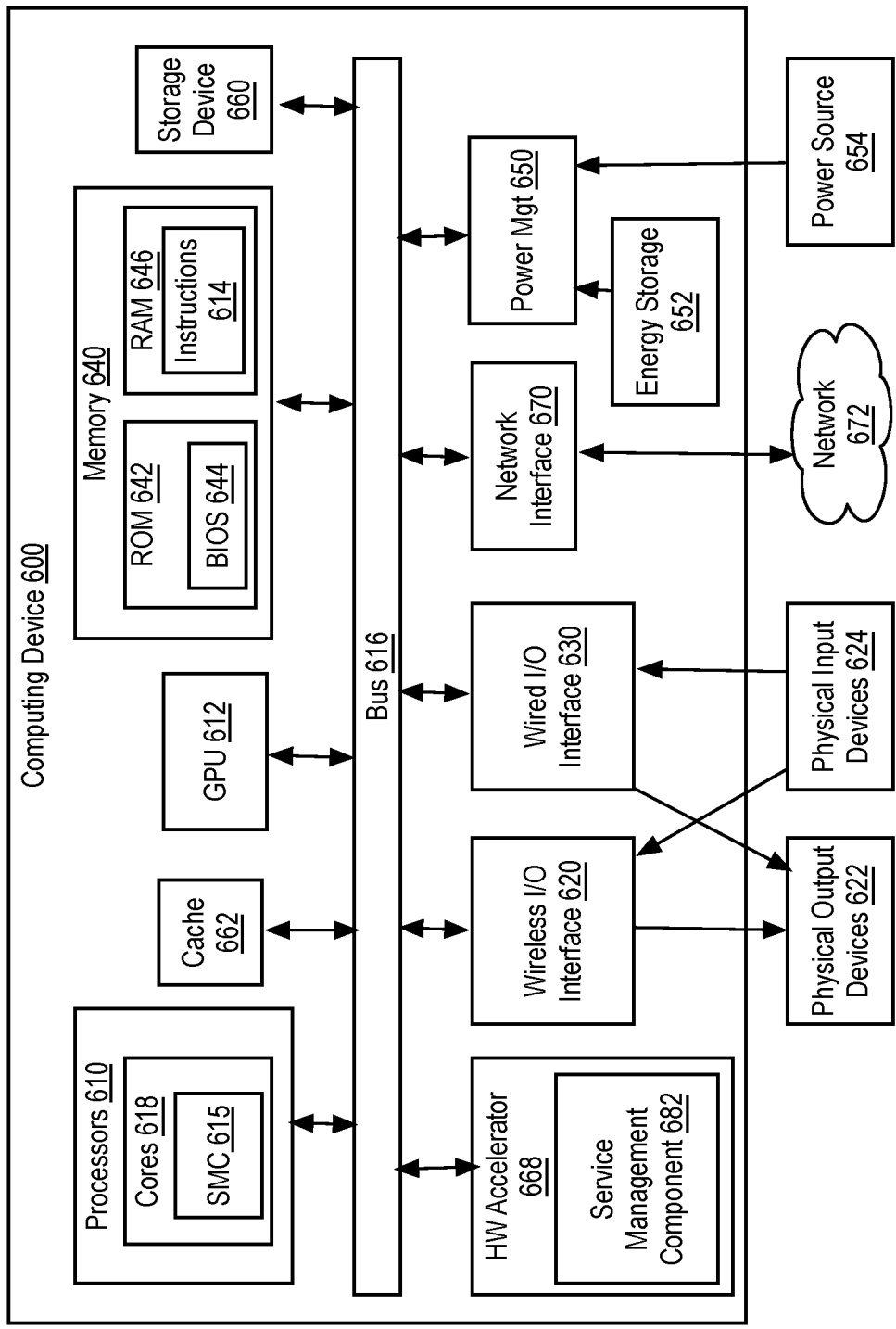
FIG. 6 is a schematic diagram of an illustrative electronic computing device to enable at-scale telemetry using interactive matrix for deterministic microservices performance, according to some embodiments.

FIG. 6 is a schematic diagram of an illustrative electronic computing device 600 to enable at-scale telemetry using interactive matrix for deterministic microservices performance, according to some embodiments. In some embodiments, the computing device 600 includes one or more processors 610 including one or more processors cores 618 including a service management component (SMC) 615, such as an service management component 170, 340 described with respect to FIGS. 1 and 3. In some embodiments, the one or more processor cores 618 establish a TEE to host the SMC 615. In some embodiments, the computing device 600 includes a hardware accelerator 668, the hardware accelerator including a service management component 682, such as service management component 170, 340 described with respect to FIGS. 1 and 3. In some embodiments, the hardware accelerator 668 establishes a TEE to host the service management component 682. In some embodiments, the computing device is to provide at-scale telemetry using interactive matrix for deterministic microservices performance, as provided in FIGS. 1-5.

The computing device 600 may additionally include one or more of the following: cache 662, a graphical processing unit (GPU) 612 (which may be the hardware accelerator in some implementations), a wireless input/output (I/O) interface 620, a wired I/O interface 630, system memory 640 (e.g., memory circuitry), power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks are not described in further detail herein, as they can be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

The following examples pertain to further embodiments. Example 1 is an apparatus to facilitate at-scale telemetry using interactive matrix for deterministic microservices performance. The apparatus of Example 1 comprises one or more processors to: receive user input comprising an objective or task corresponding to scheduling a microservice for a service, wherein the objective or task may include QoS, SLO, ML feedback; identify interaction matrix components in an interaction matrix that match the objective or tasks for the microservice; identify knowledgebase components in knowledgebase that match the objective or tasks for the microservice; and determine a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

In Example 2, the subject matter of Example 1 can optionally include wherein the one or more processors are further to schedule the microservice using the scheduling operation. In Example 3, the subject matter of any one of Examples 1-2 can optionally include wherein the interaction matrix components comprise hardware devices and microservices deployed for the service. In Example 4, the subject matter of any one of Examples 1-3 can optionally include wherein the knowledgebase components comprise hardware devices and microservices deployed for the service.

In Example 5, the subject matter of any one of Examples 1-4 can optionally include wherein the interaction matrix is generated based on telemetry data of the service, the telemetry data comprising available hardware devices, hardware device shared services, hardware device interoperability, a level of software support from components of the service, and a data flow sequence between the available hardware devices. In Example 6, the subject matter of any one of Examples 1-5 can optionally include wherein the data flow sequence is based on a roster of microservices deployed for the service, a compute flow sequence of the microservices deployed for the service, a data flow metrics for the microservices deployed for the service, and emulation capabilities and limitations of the service.

In Example 7, the subject matter of any one of Examples 1-6 can optionally include wherein the objective or task comprises one or more of a hardware device quality of service (QoS) metric corresponding to the microservice, a service level objective (SLO) corresponding to the microservice, or a machine learning (ML) feedback metric corresponding to the microservice. In Example 8, the subject matter of any one of Examples 1-7 can optionally include wherein hardware device QoS metric is based on one or more of a compute metric of hardware devices utilized by the service, a latency metric of hardware devices utilized by the service, a level of software support from components of the service, or a throughput metric of hardware devices utilized by the service.

In Example 9, the subject matter of any one of Examples 1-8 can optionally include wherein the SLO is based on one or more of options of hardware devices utilized by the service, latency/jitter QoS requirements of the service, or power/total cost of ownership (TCO) requirements of the service. In Example 10, the subject matter of any one of Examples 1-9 can optionally include wherein ML feedback metric comprises is based on one or more of reinforcement learning applied to the interaction matrix, policy management metrics, and updated weights for a network utilized to perform machine learning.

Example 11 is a non-transitory computer-readable storage medium for facilitating at-scale telemetry using interactive matrix for deterministic microservices performance. The non-transitory computer-readable storage medium of Example 11 having stored thereon executable computer program instructions that, when executed by one or more processors, cause the one or more processors to perform operations comprising: receiving, by the one or more processors, user input comprising an objective or task corresponding to scheduling a microservice for a service, wherein the objective or task may include QoS, SLO, ML feedback; identifying, by the one or more processors, interaction matrix components in an interaction matrix that match the objective or tasks for the microservice; identifying, by the one or more processors, knowledgebase components in knowledgebase that match the objective or tasks for the microservice; determining, by the one or more processors a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components; and scheduling the microservice using the scheduling operation.

In Example 12, the subject matter of Example 11 can optionally include wherein the interaction matrix is generated based on telemetry data of the service, the telemetry data comprising available hardware devices, hardware device shared services, hardware device interoperability, a level of software support from components of the service, and a data flow sequence between the available hardware devices. In Example 13, the subject matter of Examples 11-12 can optionally include wherein the data flow sequence is based on a roster of microservices deployed for the service, a compute flow sequence of the microservices deployed for the service, a data flow metrics for the microservices deployed for the service, and emulation capabilities and limitations of the service.

In Example 14, the subject matter of Examples 11-13 can optionally include wherein the objective or task comprises one or more of a hardware device quality of service (QoS) metric corresponding to the microservice, a service level objective (SLO) corresponding to the microservice, or a machine learning (ML) feedback metric corresponding to the microservice. In Example 15, the subject matter of Examples 11-14 can optionally include wherein hardware device QoS metric is based on one or more of a compute metric of hardware devices utilized by the service, a latency metric of hardware devices utilized by the service, or a throughput metric of hardware devices utilized by the service, and wherein the SLO is based on one or more of options of hardware devices utilized by the service, latency/jitter QoS requirements of the service, or power/total cost of ownership (TCO) requirements of the service.

Example 16 is a method for facilitating at-scale telemetry using interactive matrix for deterministic microservices performance. The method of Example 16 can include receiving, by one or more processors, user input comprising an objective or task corresponding to scheduling a microservice for a service, wherein the objective or task may include QoS, SLO, ML feedback; identifying, by the one or more processors, interaction matrix components in an interaction matrix that match the objective or tasks for the microservice; identifying, by the one or more processors, knowledgebase components in knowledgebase that match the objective or tasks for the microservice; and determining, by the one or more processors, a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

In Example 17, the subject matter of Example 16 can optionally include wherein the interaction matrix is generated based on telemetry data of the service, the telemetry data comprising available hardware devices, hardware device shared services, hardware device interoperability, a level of software support from components of the service, and a data flow sequence between the available hardware devices. In Example 18, the subject matter of Examples 16-17 can optionally include wherein the data flow sequence is based on a roster of microservices deployed for the service, a compute flow sequence of the microservices deployed for the service, a data flow metrics for the microservices deployed for the service, and emulation capabilities and limitations of the service.

In Example 19, the subject matter of Examples 16-18 can optionally include wherein the objective or task comprises one or more of a hardware device quality of service (QoS) metric corresponding to the microservice, a service level objective (SLO) corresponding to the microservice, or a machine learning (ML) feedback metric corresponding to the microservice. In Example 20, the subject matter of Examples 16-19 can optionally include wherein hardware device QoS metric is based on one or more of a compute metric of hardware devices utilized by the service, a latency metric of hardware devices utilized by the service, or a throughput metric of hardware devices utilized by the service, and wherein the SLO is based on one or more of options of hardware devices utilized by the service, latency/jitter QoS requirements of the service, or power/total cost of ownership (TCO) requirements of the service.

Example 21 is a system for facilitating at-scale telemetry using interactive matrix for deterministic microservices performance. The system of Example 21 can optionally include a memory to store a block of data, and a processor communicably coupled to the memory to: receive user input comprising an objective or task corresponding to scheduling a microservice for a service, wherein the objective or task may include QoS, SLO, ML feedback; identify interaction matrix components in an interaction matrix that match the objective or tasks for the microservice; identify knowledgebase components in knowledgebase that match the objective or tasks for the microservice; and determine a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

In Example 22, the subject matter of Example 21 can optionally include wherein the one or more processors are further to schedule the microservice using the scheduling operation. In Example 23, the subject matter of any one of Examples 21-22 can optionally include wherein the interaction matrix components comprise hardware devices and microservices deployed for the service. In Example 24, the subject matter of any one of Examples 21-23 can optionally include wherein the knowledgebase components comprise hardware devices and microservices deployed for the service.

In Example 25, the subject matter of any one of Examples 21-24 can optionally include wherein the interaction matrix is generated based on telemetry data of the service, the telemetry data comprising available hardware devices, hardware device shared services, hardware device interoperability, a level of software support from components of the service, and a data flow sequence between the available hardware devices. In Example 26, the subject matter of any one of Examples 21-25 can optionally include wherein the data flow sequence is based on a roster of microservices deployed for the service, a compute flow sequence of the microservices deployed for the service, a data flow metrics for the microservices deployed for the service, and emulation capabilities and limitations of the service.

In Example 27, the subject matter of any one of Examples 21-26 can optionally include wherein the objective or task comprises one or more of a hardware device quality of service (QoS) metric corresponding to the microservice, a service level objective (SLO) corresponding to the microservice, or a machine learning (ML) feedback metric corresponding to the microservice. In Example 28, the subject matter of any one of Examples 21-27 can optionally include wherein hardware device QoS metric is based on one or more of a compute metric of hardware devices utilized by the service, a latency metric of hardware devices utilized by the service, a level of software support from components of the service, or a throughput metric of hardware devices utilized by the service.

In Example 29, the subject matter of any one of Examples 21-28 can optionally include wherein the SLO is based on one or more of options of hardware devices utilized by the service, latency/jitter QoS requirements of the service, or power/total cost of ownership (TCO) requirements of the service. In Example 30, the subject matter of any one of Examples 21-29 can optionally include wherein ML feedback metric comprises is based on one or more of reinforcement learning applied to the interaction matrix, policy management metrics, and updated weights for a network utilized to perform machine learning.

Example 30 is an apparatus for facilitating at-scale telemetry using interactive matrix for deterministic microservices performance, comprising means for receiving user input comprising an objective or task corresponding to scheduling a microservice for a service, wherein the objective or task may include QoS, SLO, ML feedback; means for identifying interaction matrix components in an interaction matrix that match the objective or tasks for the microservice; means for identifying knowledgebase components in knowledgebase that match the objective or tasks for the microservice; and means for determining a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating at-scale telemetry using interactive matrix for deterministic microservices performance, configured to perform the method of any one of Examples 16-20. Example 34 is an apparatus for facilitating at-scale telemetry using interactive matrix for deterministic microservices performance, comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
   one or more processors to:
   receive user input comprising an objective or task corresponding to scheduling a microservice for a service, wherein the objective or task comprises one or more of a hardware device quality of service (QoS) metric corresponding to the microservice, a service level objective (SLO) corresponding to the microservice, or a machine learning (ML) feedback metric corresponding to the microservice;
   identify interaction matrix components in an interaction matrix that match the objective or tasks for the microservice, wherein the interaction matrix is generated based on telemetry data of the service;
   identify knowledgebase components in a knowledgebase that match the objective or tasks for the microservice; and
   determine a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

2. The apparatus of claim 1, wherein the one or more processors are further to schedule the microservice using the scheduling operation.

3. The apparatus of claim 1, wherein the interaction matrix components comprise hardware devices and microservices deployed for the service.

4. The apparatus of claim 1, wherein the knowledgebase components comprise hardware devices and microservices deployed for the service.

5. The apparatus of claim 1, wherein the telemetry data comprising available hardware devices, hardware device shared services, hardware device interoperability, a level of software support from components of the service, and a data flow sequence between the available hardware devices.

6. The apparatus of claim 5, wherein the data flow sequence is based on a roster of microservices deployed for the service, a compute flow sequence of the microservices deployed for the service, a data flow metrics for the microservices deployed for the service, and emulation capabilities and limitations of the service.

7. The apparatus of claim 5, wherein hardware device QoS metric is based on one or more of a compute metric of hardware devices utilized by the service, a latency metric of hardware devices utilized by the service, a level of software support from components of the service, or a throughput metric of hardware devices utilized by the service.

8. The apparatus of claim 5, wherein the SLO is based on one or more of options of hardware devices utilized by the service, latency/jitter QoS requirements of the service, or power/total cost of ownership (TCO) requirements of the service.

9. The apparatus of claim 5, wherein ML feedback metric comprises is based on one or more of reinforcement learning applied to the interaction matrix, policy management metrics, and updated weights for a network utilized to perform machine learning.

10. A non-transitory computer-readable storage medium having stored thereon executable computer program instructions that, when executed by one or more processors, cause the one or more processors to perform operations comprising:
    receiving, by the one or more processors, user input comprising an objective or task corresponding to scheduling a microservice for a service, wherein the objective or task comprises one or more of a hardware device quality of service (QoS) metric corresponding to the microservice, a service level objective (SLO) corresponding to the microservice, or a machine learning (ML) feedback metric corresponding to the microservice;
    identifying, by the one or more processors, interaction matrix components in an interaction matrix that match the objective or tasks for the microservice, wherein the interaction matrix is generated based on telemetry data of the service;

identifying, by the one or more processors, knowledgebase components in a knowledgebase that match the objective or tasks for the microservice;

determining, by the one or more processors a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components; and scheduling the microservice using the scheduling operation.

11. The non-transitory computer-readable storage medium of claim 10, wherein the telemetry data comprising available hardware devices, hardware device shared services, hardware device interoperability, a level of software support from components of the service, and a data flow sequence between the available hardware devices.

12. The non-transitory computer-readable storage medium of claim 11, wherein the data flow sequence is based on a roster of microservices deployed for the service, a compute flow sequence of the microservices deployed for the service, a data flow metrics for the microservices deployed for the service, and emulation capabilities and limitations of the service.

13. The non-transitory computer-readable storage medium of claim 12, wherein hardware device QoS metric is based on one or more of a compute metric of hardware devices utilized by the service, a latency metric of hardware devices utilized by the service, or a throughput metric of hardware devices utilized by the service, and wherein the SLO is based on one or more of options of hardware devices utilized by the service, latency/jitter QoS requirements of the service, or power/total cost of ownership (TCO) requirements of the service.

14. A method comprising:

receiving, by one or more processors, user input comprising an objective or task corresponding to scheduling a microservice for a service, wherein the objective or task comprises one or more of a hardware device quality of service (QoS) metric corresponding to the microservice, a service level objective (SLO) corresponding to the microservice, or a machine learning (ML) feedback metric corresponding to the microservice;

identifying, by the one or more processors, interaction matrix components in an interaction matrix that match the objective or tasks for the microservice, wherein the interaction matrix is generated based on telemetry data of the service;

identifying, by the one or more processors, knowledgebase components in a knowledgebase that match the objective or tasks for the microservice; and determining, by the one or more processors, a scheduling operation for the microservice, the scheduling operation to deploy the microservice in a configuration that is in accordance with the objective or task, wherein the configuration comprises a set of hardware devices and microservice interaction points determined based on the interaction matrix components and the knowledgebase components.

15. The method of claim 14, wherein the telemetry data comprising available hardware devices, hardware device shared services, hardware device interoperability, a level of software support from components of the service, and a data flow sequence between the available hardware devices.

16. The method of claim 15, wherein the data flow sequence is based on a roster of microservices deployed for the service, a compute flow sequence of the microservices deployed for the service, a data flow metrics for the microservices deployed for the service, and emulation capabilities and limitations of the service.

17. The method of claim 14, wherein hardware device QoS metric is based on one or more of a compute metric of hardware devices utilized by the service, a latency metric of hardware devices utilized by the service, or a throughput metric of hardware devices utilized by the service, and wherein the SLO is based on one or more of options of hardware devices utilized by the service, latency/jitter QoS requirements of the service, or power/total cost of ownership (TCO) requirements of the service.

18. The non-transitory computer-readable storage medium of claim 11, wherein ML feedback metric comprises is based on one or more of reinforcement learning applied to the interaction matrix, policy management metrics, and updated weights for a network utilized to perform machine learning.

19. The method of claim 15, wherein ML feedback metric comprises is based on one or more of reinforcement learning applied to the interaction matrix, policy management metrics, and updated weights for a network utilized to perform machine learning.

20. The method of claim 15, wherein the interaction matrix components comprise hardware devices and microservices deployed for the service.

* * * * *